(12) United States Patent
Clark et al.

(10) Patent No.: US 10,076,986 B2
(45) Date of Patent: Sep. 18, 2018

(54) VEHICLE SEAT

(71) Applicant: Johnson Controls Technology Company, Holland, MI (US)

(72) Inventors: Kenneth M. Clark, Howell, MI (US); Raza Ahmed Bashir, Sterling Heights, MI (US); Anthony Spadaro, Northville, MI (US)

(73) Assignee: ADIENT LUXEMBOURG HOLDING S.A.R.L., Luxembourg (LU)

(*) Notice: Subject to any disclaimer, the term of this patent is extended or adjusted under 35 U.S.C. 154(b) by 114 days.

(21) Appl. No.: 15/102,345

(22) PCT Filed: Dec. 15, 2014

(86) PCT No.: PCT/US2014/070303
§ 371 (c)(1),
(2) Date: Jun. 7, 2016

(87) PCT Pub. No.: WO2015/095025
PCT Pub. Date: Jun. 25, 2015

(65) Prior Publication Data
US 2017/0008438 A1    Jan. 12, 2017

Related U.S. Application Data

(60) Provisional application No. 61/916,628, filed on Dec. 16, 2013.

(51) Int. Cl.
*B60N 2/01* (2006.01)
*B60N 3/10* (2006.01)
(Continued)

(52) U.S. Cl.
CPC ............ *B60N 3/102* (2013.01); *B60N 2/01* (2013.01); *B60N 2/64* (2013.01); *B60N 2/7005* (2013.01);
(Continued)

(58) Field of Classification Search
CPC . B60N 3/102; B60N 2/01; B60N 2/64; B60N 3/103
(Continued)

(56) References Cited

U.S. PATENT DOCUMENTS 6,386,629 B1 * 5/2002 Severinski ........... B60N 2/3011
297/113
7,600,811 B2   10/2009 Park et al.
(Continued)

FOREIGN PATENT DOCUMENTS

CN        1488531 A     4/2004
CN       101376356 A    3/2009
(Continued)

OTHER PUBLICATIONS

Office Action dated May 15, 2017, received in corresponding Chinese application No. 201480074965.3, 7 pages.
(Continued)

*Primary Examiner* — Syed A Islam
(74) *Attorney, Agent, or Firm* — Foley & Lardner LLP (57) ABSTRACT

A vehicle seat for providing seating for an occupant within a vehicle may include an anchoring mechanism and a reversible seat cushion. The reversible seat cushion may be configured to be reversible between a seating position and a storage position and to be removable from and attachable to the anchoring mechanism in each of the seating position and the storage position. The reversible seat cushion may include a seating side and a storage side. In the seating position, the seating side may be exposed to provide support beneath the occupant and the storage side is concealed. In the storage position, the storage side may be exposed to provide a storage area and the seating side is concealed.

15 Claims, 7 Drawing Sheets

(51) Int. Cl.
*B60N 2/64* (2006.01)
*B60N 2/70* (2006.01)
*B60R 7/04* (2006.01)

(52) U.S. Cl.
CPC .............. *B60N 3/10* (2013.01); *B60N 3/103* (2013.01); *B60R 7/043* (2013.01)

(58) Field of Classification Search
USPC ............... 297/188.09, 188.12, 188.1, 188.2, 297/188.01–188.21
See application file for complete search history.

(56) References Cited

U.S. PATENT DOCUMENTS

| 2004/0155494 | A1* | 8/2004 | Mizuno | B60N 2/305 297/188.09 |
| 2012/0074741 | A1* | 3/2012 | Andersson | B60N 2/46 297/188.14 |

FOREIGN PATENT DOCUMENTS

| DE | 10 2007 014 656 A1 | 6/2008 |
| EP | 1 400 396 A2 | 3/2004 |
| FR | 2950005 A1 | 3/2011 |
| GB | 0 302 324 | 3/1930 |
| JP | H61-179133 | 11/1986 |
| JP | H02-220936 A | 9/1990 |
| JP | 08-127279 | 5/1996 |
| JP | H09-104277 A | 4/1997 |
| JP | 2001-169854 A | 6/2001 |
| JP | 2006-123583 A | 5/2006 |
| JP | 2013-220781 A | 10/2013 |

OTHER PUBLICATIONS

Office Action dated Jan. 9, 2017, in corresponding Korean application No. 10-2016-7018738 (7 pages) and English translation (7 pages).
Office Action dated Jul. 18, 2017, in corresponding Japanese Application No. 2016-539090, 3 pages.
International Search Report in PCT/US2014/070303 dated Apr. 20, 2015, 4 pages.
Written Opinion of the International Searching Authority in PCT/US2014/070303 dated Apr. 20, 2015, 4 pages.
International Preliminary Report on Patentability dated Jun. 21, 2016, received in corresponding International Application No. PCT/US2014/070303, 5 pages.

* cited by examiner

VEHICLE SEAT

CROSS-REFERENCE TO RELATED PATENT APPLICATIONS

The present application is a U.S. National Stage of International Application No. PCT/US2014/070303 filed on Dec. 15, 2014, which claims the benefit of U.S. Provisional Application No. 61/916,628 filed on Dec. 16, 2013, the entire disclosures of all of which are incorporated herein by reference.

FIELD

The present application relates generally to vehicle seats for providing seating for an occupant within a vehicle.

BACKGROUND

Often, the rear (e.g., second) row vehicle seats in a vehicle are fixed and only may provide seating to occupants. However, a full seating capacity may not be required within a vehicle according to the current needs of the occupants. Thus, unused seating capacity may be provided at the expense of available storage. Conversely, in other vehicles, a fixed storage area may be provided within the rear row vehicle seats at the expense of seating for an additional occupant. Currently, vehicles may provide a device or method to completely remove the center portion of the rear row vehicle seats when there is no occupant, but it does not optimize seating or storage based on needs of the vehicle occupants.

Further, due to the geometry of the rear row vehicle seats and the slight elevation of the center portion of the rear row vehicle seats due to the bolster regions, it may be difficult to reach ISOFIX wires in order to attach a child seat to the center portion of the rear row vehicle seats. For example, the seat cushion must be physically compressed by the user in order to access the ISOFIX wires while attaching the child seat to the wires and ensuring that the attachment is properly engaged.

Additionally, seating for the center occupant of the rear row vehicle seats may be uncomfortable since the center region is often narrowed by the inboard bolster regions of the outboard seats.

It may be desirable to provide a vehicle seat that optionally provides a seating area and a storage area based on the current need of the vehicle occupants, while providing easier access to the ISOFIX wires and more comfortable seating in the center portion of the rear row vehicle seats.

SUMMARY

According to one embodiment, a vehicle seat for providing seating for an occupant within a vehicle may include an anchoring mechanism and a reversible seat cushion. The reversible seat cushion may be configured to be reversible between a seating position and a storage position and to be removable from and attachable to the anchoring mechanism in each of the seating position and the storage position. The reversible seat cushion may include a seating side and a storage side. In the seating position, the seating side may be exposed to provide support beneath the occupant and the storage side is concealed. In the storage position, the storage side may be exposed to provide a storage area and the seating side is concealed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Referring generally to the figures, disclosed herein is a vehicle seat for providing seating for an occupant within a vehicle, as shown according to exemplary embodiments, that may include an anchoring mechanism and a reversible seat cushion. The vehicle seat described herein may be used in a variety of applications and moveable devices. For example, the vehicle seat may be useful in any non-vehicle application wherein it would be desirable to have vehicle seat with a reversible seat cushion. In one exemplary embodiment, the vehicle seat may be a seat within a rear row vehicle seats in a vehicle. The term rear row refers to a row behind the front seats of the vehicle and is not necessarily the rearmost row. Preferably, it is the second row. In a first configuration (i.e., a seating position), the reversible seat cushion provide a seat on the vehicle seat for an occupant within the vehicle. In a second configuration (i.e., a storage position), the reversible seat cushion may provide a storage area on the vehicle seat.

Figure 1:
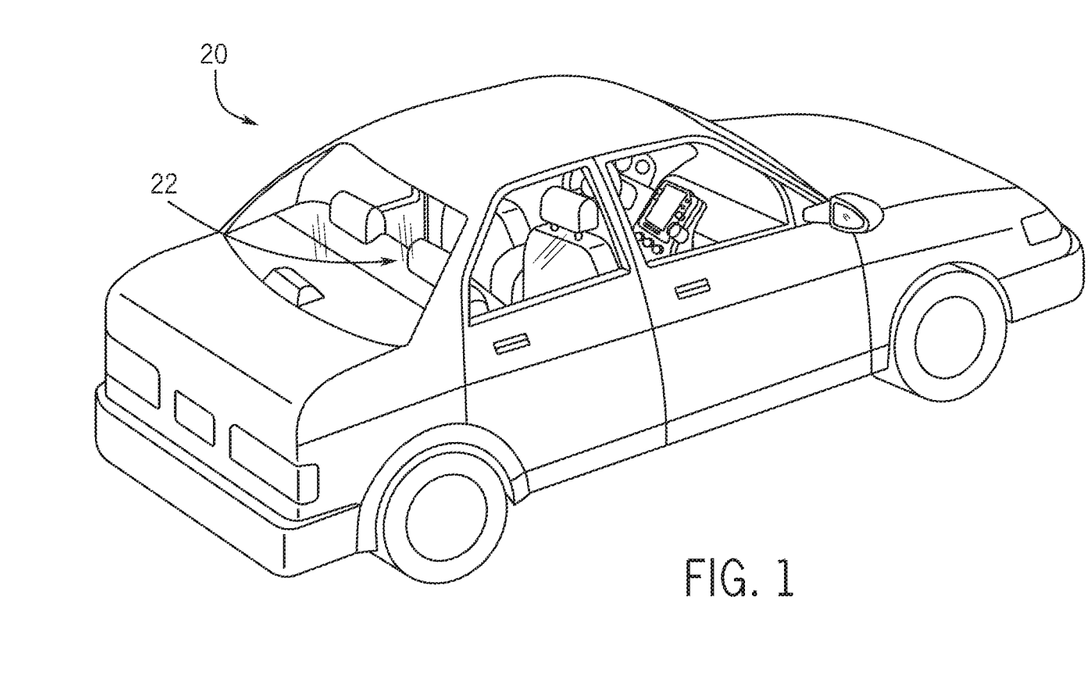
FIG. 1 is a perspective view of a vehicle according to one embodiment.

FIG. 1 illustrates an exemplary embodiment of a vehicle 20 that may include an interior passenger compartment containing at least one vehicle seat 22 with a reversible seat cushion for providing seating to at least one occupant or a storage area. Although a four door sedan automobile is shown in FIG. 1, the reversible seat cushion may be used in a variety of applications, but is particularly useful within a vehicle seat in any type of vehicle, such as a two door or four door automobile, a truck, a SUV, a van, a train, a boat, an airplane, or other suitable vehicular conveyance.

The vehicle seat 22 may include the reversible seat cushion 30 to provide support beneath the occupant or a storage area (as described further herein) and a seat back 21 to provide support to a back of the occupant. The vehicle seat 22 may be located anywhere within the vehicle 20. As shown in FIG. 1, the vehicle seat 22 may be in the rear of the vehicle (e.g., in the $2^{nd}$, $3^{rd}$, or rear row of vehicle seats). According to another embodiment, the vehicle seat 22 may be in a middle row or a front row.

Figure 2:
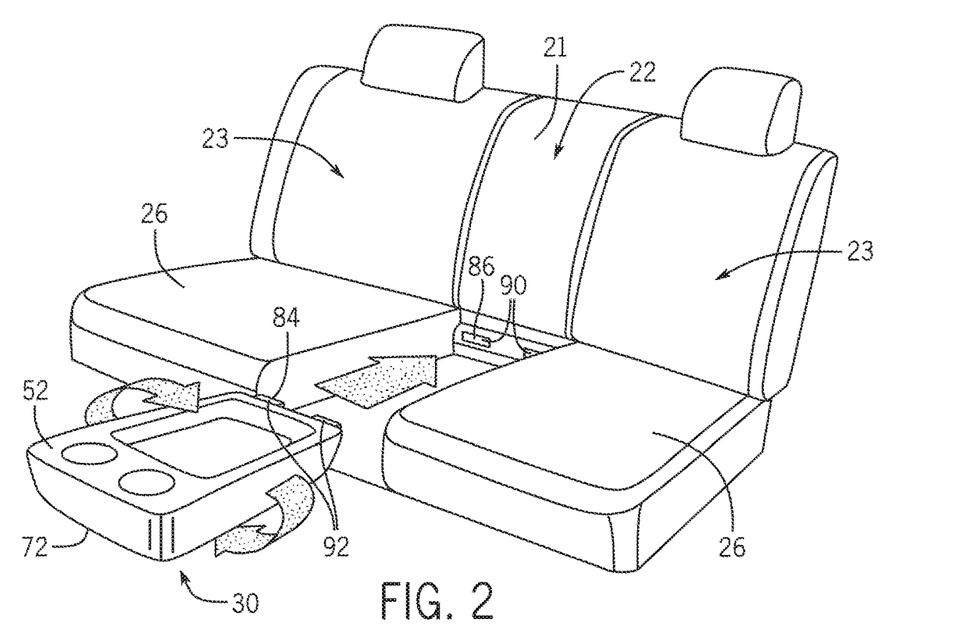
FIG. 2 is a perspective view of a vehicle seat with a reversible seat cushion in a row of vehicle seats that can be disposed in the vehicle of FIG. 1 according to one embodiment.

The vehicle seat 22 may be a seat within a row of seats, as shown in FIG. 2. If the vehicle seat 22 is part of a row of seats, the vehicle seat 22 may have one or two adjacent seats 23 on one or both sides of the vehicle seat 22. According to one embodiment, the vehicle seat 22 may be an inboard seat in the middle or center of a row of seats (as shown in FIG. 2) and surrounded by two adjacent seats 23. According to another embodiment, the vehicle seat 22 may be an outboard seat on an end of the row of seats and surrounded by one adjacent seat 23.

According to one embodiment as depicted in FIG. 2, the vehicle seat 22 may include that reversible seat cushion 30 to allow the user to have the option of an additional seat or additional storage. The reversible seat cushion 30 may be reversible between different configurations or positions, such as a seating position 70 and a storage position 50. The configuration of the reversible seat cushion 30 depends on the current use of the reversible seat cushion 30 desired by the vehicle occupants. The two sides of the reversible seat cushion 30 give the reversible seat cushion 30 dual functionality as either a seating area or a dedicated storage area. For example, the reversible seat cushion 30 in FIG. 2 may provide seating for three vehicle occupants in the seating position 70 or seating for two vehicle occupants and an additional storage area in the storage position 50, depending on the current need of the vehicle occupants.

Accordingly, the reversible seat cushion 30 may have two distinct sides, a seating side 72 and a storage side 52, in order to provide the seating position 70 and the storage position 50, depending on which side of the reversible seat cushion 30 is facing upward and exposed. Depending on the positioning of the vehicle seat 22, the vehicle seat 22 may provide seating or storage in a variety of different areas within the vehicle 20 (including in the center of a rear row of vehicle seats).

Figure 4:
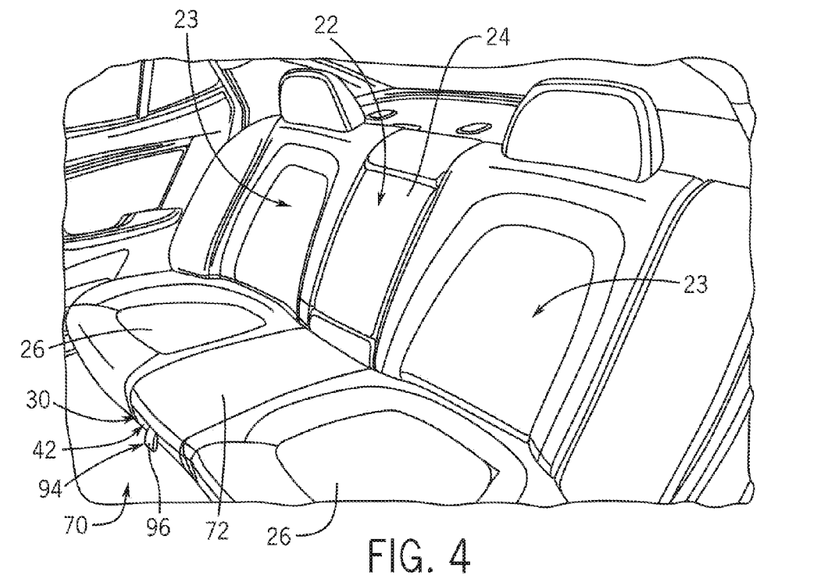
FIG. 4 is a perspective view of the vehicle seat of FIG. 3 with the reversible seat cushion in a seating position.
Figure 5A:
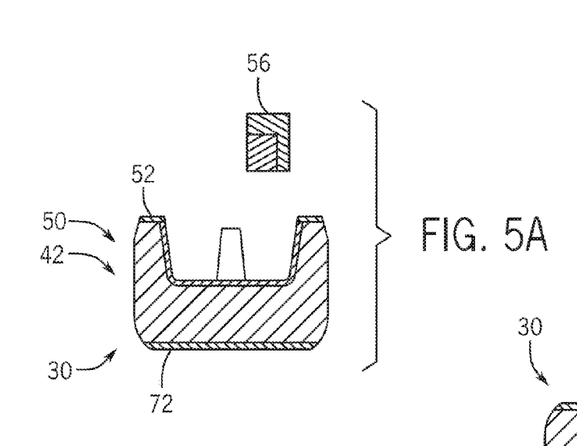
FIG. 5A is a cross-sectional view of the reversible seat cushion of FIG. 3 in the storage position.
Figure 5B:
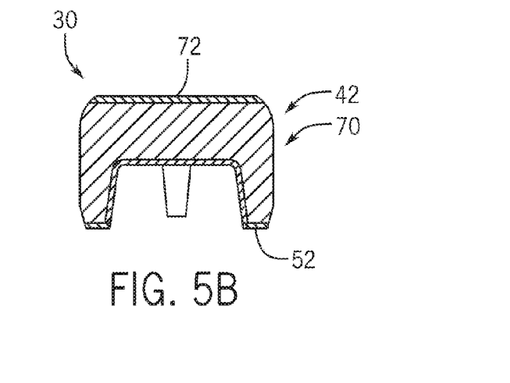
FIG. 5B is a cross-sectional view of the reversible seat cushion of FIG. 3 in the seating position.

As shown in FIGS. 4 and 5B, in the seating position 70, the seating side 72 may be exposed and facing upward to provide a seating area on the vehicle seat 22 for the occupant to sit on or to provide support beneath the occupant. While in the seating position 70 with the seating side 72 exposed, the storage side 52 may be concealed.

Figure 3:
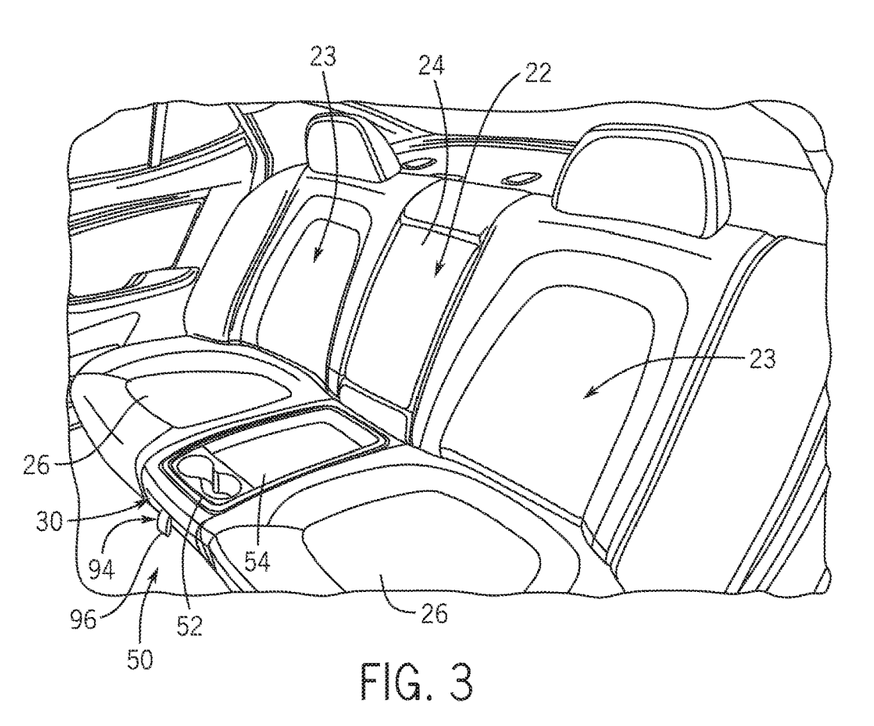
FIG. 3 is a perspective view of a vehicle seat with a reversible seat cushion in a row of vehicle seats that can be disposed in the vehicle of FIG. 1 according to one embodiment with the reversible seat cushion in a storage position.

Alternatively, as shown in FIGS. 3 and 5A, in the storage position 50, the storage side 52 may be exposed and facing upward to provide a storage area and to allow the vehicle seat 22 to be used for storage. While in the storage position 50 with the storage side 52 exposed, the seating side 72 may be concealed.

According to one embodiment, the seating side 72 and the storage side 52 may be on opposite sides of the reversible seat cushion 30. FIGS. 5A-5B and 10A-10B depict the two opposing and different sides of the reversible seat cushion 30. Accordingly, as shown in FIG. 1, the reversible seat cushion 30 may be removed from the vehicle seat 22 and flipped 180 degrees to switch between the seating position 70 and the storage position 50, tints revealing either a storage side 52 or a seating side 72 and concealing the other. Once the reversible seat cushion 30 has been removed and flipped, the reversible seat cushion 30 may be reconfigured and re-secured or attached to the vehicle seat 22 in the desired position.

Figure 8:
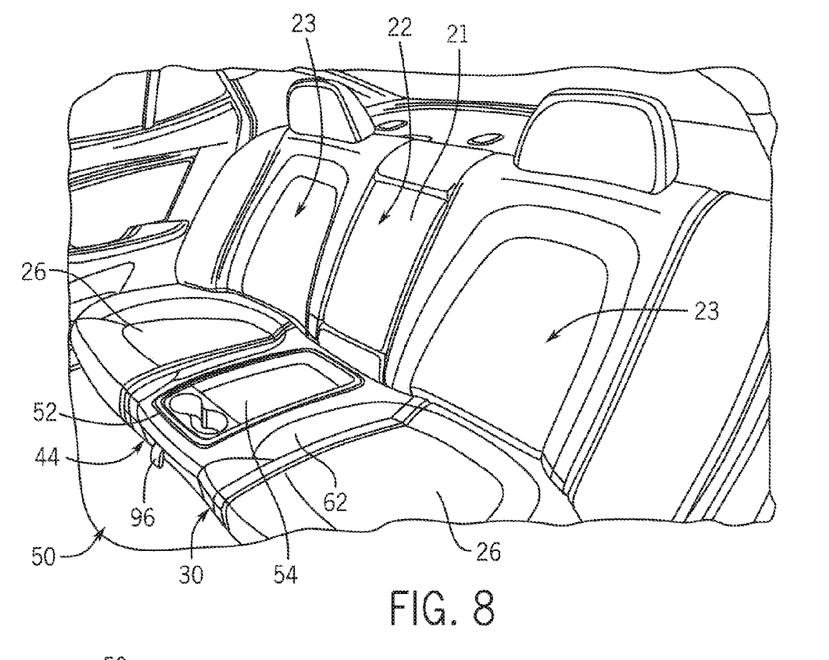
FIG. 8 is a perspective view of the vehicle seat of FIG. 7 with the reversible seat cushion in a storage position.

The storage side 52 of the reversible seat cushion may be used for a variety of different purposes. For example, the storage side 52 may function as a general storage area, a storage area for kids toys, a cup holder, a covered storage (with a padded or hard lid), an electronic writing surface, a cellphone holder and charger (as discussed later), a food tray or surface, and/or a work surface. According to the desired purpose, the storage side 52 may include an embedded hard plastic tray 54 with a bezel into the soft-trim, as shown in FIGS. 3 and 8.

As shown in FIG. 5A, a removable modular component 56 may be provided as a removable portion and may be an after-market add-on for use with the storage side 52. The modular component 56 may be configured to fit within a portion of the storage side 52. The reversible seat cushion 30 may provide a conventional connector (not shown) to integrate the modular component into the storage side 52 of the reversible seat cushion 30. Alternatively, the modular component 56 may completely replace the reversible seat cushion 30. A variety of modular components 56 may be provided with different benefits and features, such as those listed above for the storage side 52. The user may therefore pick which modular component(s) 56 to add to the reversible seat cushion 30 according to specific needs.

As shown in FIG. 3, an armrest 24 (currently in a concealed position) may still be integrated into the vehicle seat 22 with the reversible seat cushion 30 in place. Typically, vehicle armrests may include an interior storage area (e.g. the cup holders and/or covered storage area). Accordingly, with the reversible seat cushion 30, the occupant may be provided with twice the storage room from both the armrest 24 storage area and the reversible seat cushion 30 storage area. According to another embodiment, the armrest 24 may be simplified and may be designed as a dedicated armrest and not a storage area due to the additional storage area provided by the reversible seat cushion 30. By eliminating the storage area within the armrest 24, the armrest 24 may be constructed as a more comfortable armrest (thicker and more foam) and may be less expensive and lighter.

Figure 9:
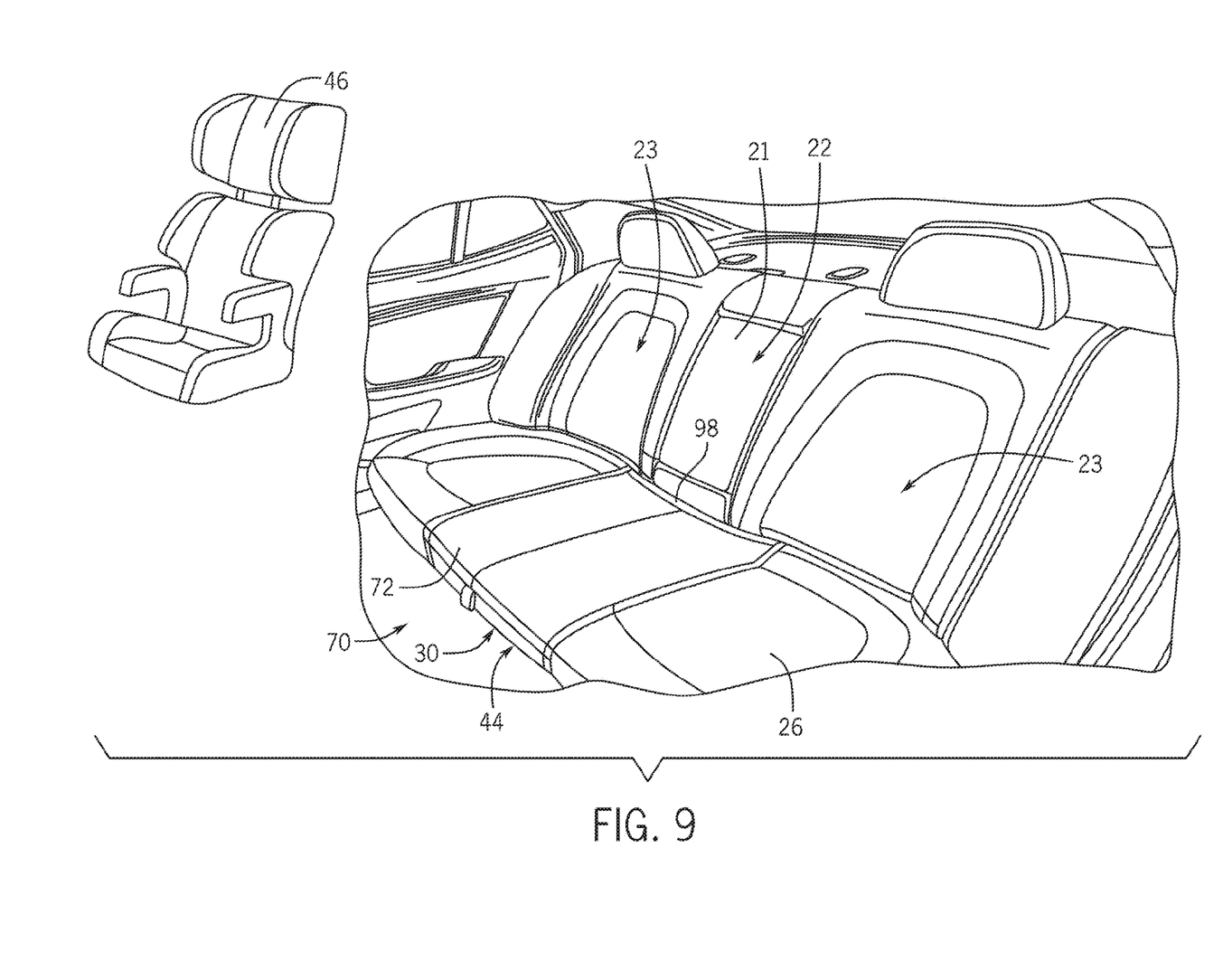
FIG. 9 is a perspective view of the vehicle seat of FIG. 7 with the reversible seat cushion in a seating position.

Aside from providing seating to an occupant, the seating side 72 of the reversible seat cushion 30 may be used in a variety of different ways according to the desired use. For example, as shown in FIG. 9, the seating side 72 may provide the large, flat portion to hold a child seat 46. The child seat 46 may attach to ISOFIX attachments such as loops or steel wires in the biteline area (between the seat cushion and the seatback)) to be secured to the vehicle seat 22. Due to the configuration, design, and geometry of the reversible seat cushion 30, it may be easier to reach the ISOFIX attachments and to attach the child seat 46 to the ISOFIX attachments. More specifically, the flat seating side 72 of the reversible seat cushion 30 provides a space 98 in the biteline area, eliminating the need to exert pressure to compress the seat cushion in order to access the ISOFIX wires and thereby allowing easier access to the ISOFIX wires.

Figure 6:
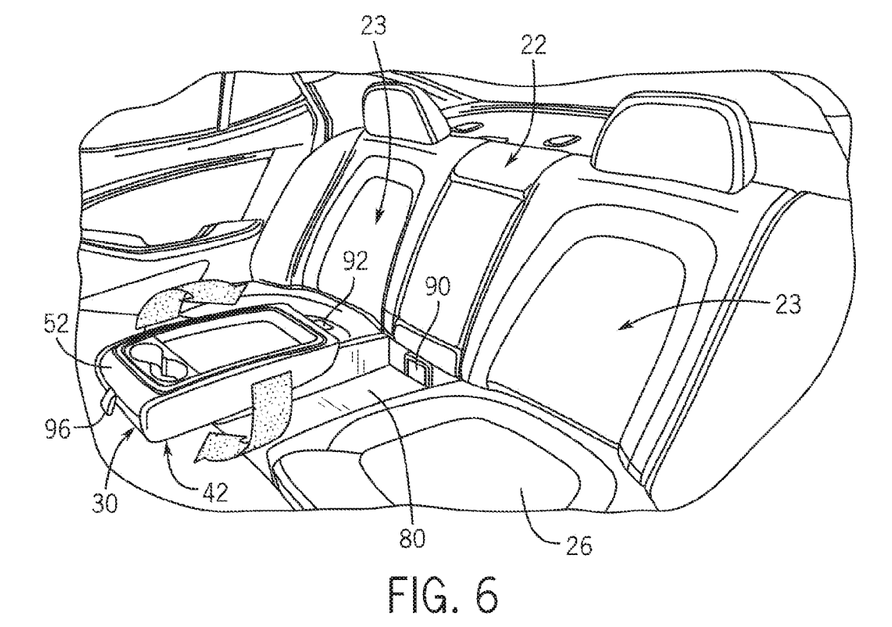
FIG. 6 is a perspective view of the vehicle seat of FIG. 3 with the reversible seat cushion detached.

The vehicle seat 22 may further include an anchoring mechanism 90, as shown in FIGS. 2 and 6, to releasably secure the reversible seat cushion 30 to the body of the vehicle seat 22. The reversible seat cushion 30 may be removable from and attachable to the anchoring mechanism 90 in both the seating position 70 and the storage position 50. According to one embodiment as shown in FIG. 2, attaching the reversible seat cushion 30 to the anchoring mechanism 90 positions the reversible seat cushion on or near the seat back 21 of the vehicle seat 22.

The anchoring mechanism 90 and the reversible seat cushion 30 may be attachable through a variety of different mechanisms to maintain safety within the vehicle while allowing the position of the reversible seat cushion 30 to be altered. According to one embodiment, the reversible seat cushion 30 may include a latching mechanism 92 to attach the reversible seat cushion 30 to the anchoring mechanism 90. The anchoring mechanism 90 and/or the latching mechanism 92 may include straps, a snap-in mechanism, or clipping mechanism (similar to a seat belt buckle mechanism). Such anchoring and latching mechanisms can be determined by an ordinarily skilled worker based on this disclosure.

The vehicle seat 22 may further comprise a release mechanism 94 to allow the reversible seat cushion 30 to be detached or removed from the anchoring mechanism 90 and flipped with a variety of different mechanisms. According to one embodiment as shown in FIGS. 3 and 4, the release mechanism 94 may include a pull tab 96 on the reversible seat cushion 30. The pull tab 96 may be used to detach the reversible seat cushion 30 by releasing the latching mechanism 92 or the anchoring mechanism 90. Although the pull tab 96 is shown on the reversible seat cushion 30, it is anticipated that the release mechanism 94 may be located on other areas of the vehicle seat 22.

The release mechanism 94 may be mechanically and/or electrically based. For example, the release mechanism 94 may include a button to mechanically or electrically activate the release. The specific structure of the release mechanism can be determined by an ordinarily skilled worker based on this disclosure.

Figure 7:
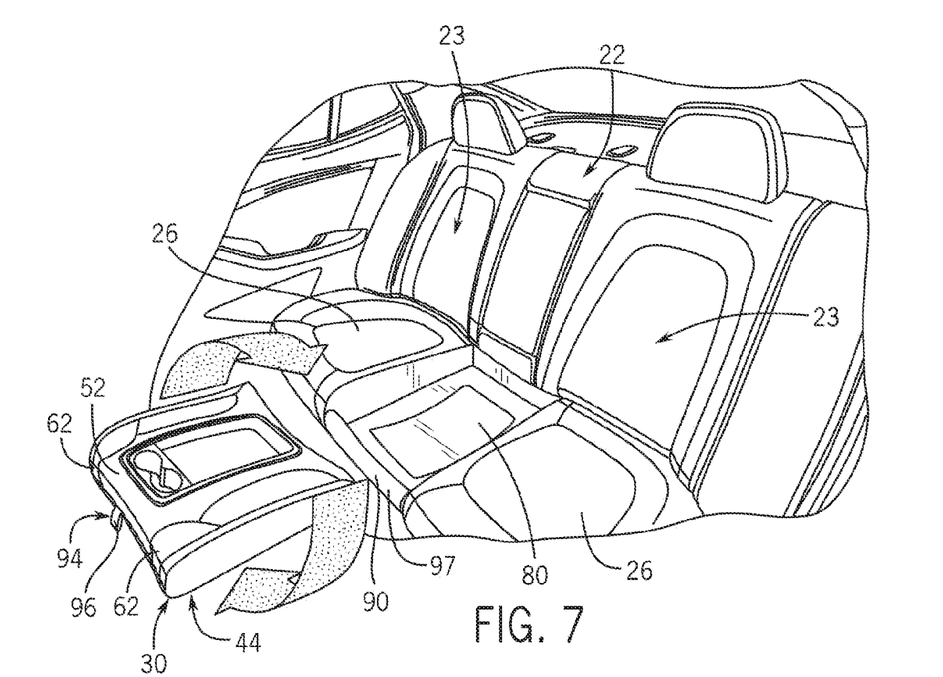
FIG. 7 is a perspective view of a vehicle seat with a reversible seat cushion in a of vehicle seats that can be disposed in the vehicle of FIG. 1 according to another embodiment.

According to one embodiment, the vehicle seat 22 may include two adjacent seat cushions 26 (e.g., along a row of vehicle seats). The reversible seat cushion 30 may be positioned between the two adjacent seat cushions 26 in both the seating position 70 and the storage position 50. The shape and size between the adjacent seat cushion 26 and the area beneath the reversible seat cushion 30 may be complementary to at least one side of the reversible seat cushion 30. The reversible seat cushion 30 may be firmly fit between the edges of the two adjacent seat cushions 26 to maintain the position of the reversible seat cushion 30. According to one embodiment as shown in FIGS. 7 and 10B, the anchoring mechanism 90 may include certain indentations (e.g., the lowered center region 81) and/or protrusions (e.g., the raised sides 83 or the lip 97) to interlock with (similar to a puzzle piece) and complement the shape of the reversible seat cushion 30 and to prevent the reversible seat cushion 30 from sliding forward.

The reversible seat cushion 30 may be a variety of different sizes with respect to the vehicle seat 22 (and optionally a row of vehicle seats), according to the desired use and configuration. For example, FIG. 6 depicts the reversible seat cushion 30 in a small size 42 and FIG. 7 depicts the reversible seat cushion 30 in a large size 44. According to one embodiment, the small size 42 may take up approximately 20% of the cross-vehicle width (e.g., the lengthwise size) of the vehicle seat row (which may include the vehicle seat 22 and two adjacent vehicle seats 23). According to another embodiment, the large size 44 may take up approximately 33% of the cross-vehicle width of the rear row. The child seat 46 may be used in conjunction with the small size 42 or the large size 44 of the reversible seat cushion 30.

As shown in FIG. 4, the small size 42 of the reversible seat cushion 30 may only include a raised middle portion of the vehicle seat 22. The sides or edges of the reversible seat cushion 30 of the small size 42 may match the height of (e.g., be level with) and be flush with the edge (e.g., the inboard side-bolster regions) of the adjacent seat cushions 26 in the seating position 70 and the storage position 50. Since the small size 42 is smaller and has less mass, the small size 42 may be less expensive and weigh less than the large size 44. Further, since the inboard side-bolster regions of the adjacent seat cushions 26 are not flipped with the reversible seat cushion 30, the comfort of the outboard seating in the adjacent seats 23 is not compromised in the storage position 50 or the seating position 70.

Figure 10A:
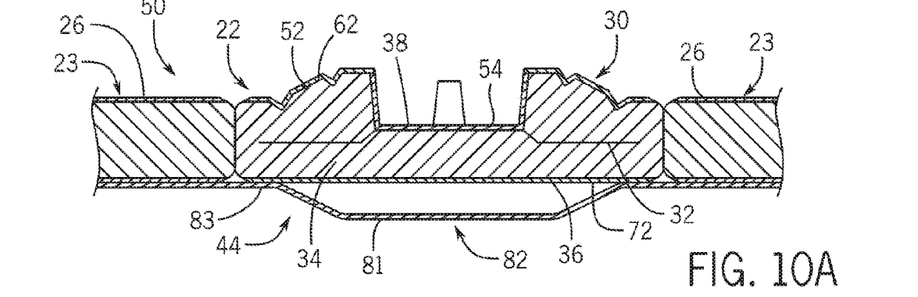
FIG. 10A is a cross-sectional view of the reversible seat cushion of FIG. 7 in the storage position.
Figure 10B:
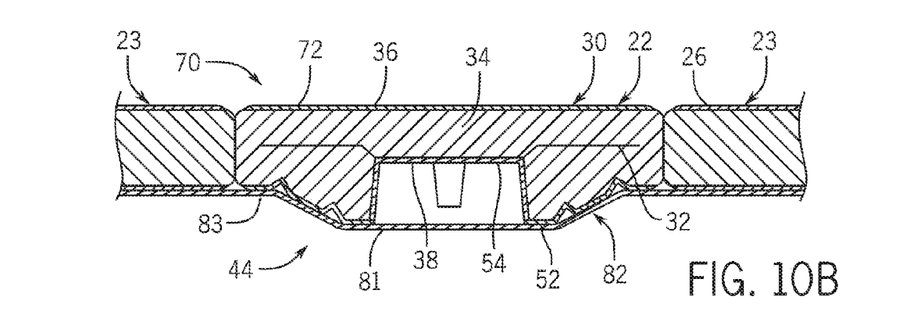
FIG. 10B is a cross-sectional view of the reversible seat cushion of FIG. 7 in the seating position.

As shown in FIGS. 8 and 10A, the storage side 52 of the large size 44 of the reversible seat cushion 30 may include at least a portion of the inboard side-bolster region 62 of at least one of the adjacent seat cushions 26 of the outboard adjacent vehicle seats 23 to provide more space and comfort for the outboard occupants while in the storage position 50. As shown in FIGS. 9 and 10B, the large size 44 may provide an exposed, large, substantially flat portion on the seating side 72 when in the seating position 70. Due to the width of the large size 44, the seating side 72 may provide a wider middle portion or more insert space in the center portion than the small size 42. Therefore, the occupant in the vehicle seat 22 may be provided with more comfort, while still providing the storage benefits of the reversible seat cushion 30 when flipped to the storage position 50. The edges of the reversible seat cushion 30 may be flush and level with the edge of the adjacent seat cushions 26 of the adjacent vehicle seats 23 in the storage position 50 and the seating position 70.

As shown in FIGS. 10A and 10B, a trough, deepened void, or lower support region 82 may be located beneath the reversible seat cushion 30 when the reversible seat cushion 30 is attached to the anchoring mechanism 90. The support region 82 may have a lowered center region 81 with raised sides 83 (e.g., a raised perimeter or a flat ring around the edges), such that the support region 82 and the storage side 52 of the reversible seat cushion have complementary shapes.

Accordingly, when the reversible seat cushion 30 is in the seating position 70 (FIG. 10B), the storage side 52 may lay flush within the lowered center region 81 and the raised sides 83 of the lowered support region 82 to allow the seating side 72 to be level and/or flat with the adjacent seat cushions 26. When the reversible seat cushion 30 is in the storage position 50 (FIG. 10A), the seating side 72 may rest or sit along raised sides 83 to allow the storage side 52 to sit higher than the adjacent seat cushions 26 and to effectively replace the inboard side-bolsters of both the outboard adjacent seats 23. Alternatively or additionally, the support region 82 may complement the contours of the seating side 72, including any bolster regions of the seating side 72.

According to one embodiment, an additional recessed storage area 80 may be constructed within the lower support region (e.g., underneath where the reversible seat cushion 30 is attached). The recessed storage area 80 may be accessible when the reversible seat cushion 30 is removed and may include additional features or space depending on the overall vehicle structure and the vehicle seat structure. The reversible seat cushion 30 may be completely removed from the vehicle seat 22 to allow continuous access to the recessed storage area 80. The recessed storage area 80 may optionally include a cover (in addition to the reversible seat cushion optionally resting on top of the recessed storage area 80).

As shown in FIG. 2, the reversible seat cushion 30 may further include a cushion-side electrical connector 84 configured to be attachable to and removable from a vehicle-side electrical connector 86 to access electricity from the vehicle within the reversible seat cushion 30. The electrical connectors 84 and 86 may optionally be integrated with the latching mechanism 92 and the anchoring mechanism 90, respectively. The specific structure of the electrical connectors 84 and 86 can be determined by an ordinarily skilled worker based on this disclosure.

These electrical connectors 84 and 86 may facilitate an energy connection from the vehicle's power source to the reversible seat cushion 30 for the occupants of the vehicle 20. For example, the anchoring mechanism 90 may be conductible and/or the reversible seat cushion 30 may have electrical contacts that connect with an electrical connector positioned on the body of the vehicle seat 22 to access electricity. This electricity may enable the reversible seat cushion 30 to provide a variety of different features, including, but not limited to, connectivity to an electrical device, lit cup holders, heated cup holders, a charging mat, a lamp or light source, a charging source (e.g. USB charging), an auxiliary input connection, and a fan.

A traditional seatbelt system may be used with the vehicle seat 22. Optionally, cutouts in the reversible seat cushion 30, the seat back 21, and/or other areas of vehicle seat 22 may be used to secure the seatbelt buckles. The buckles may also be held in place with sleeves, plastic, or a band (such as an elastic band).

The vehicle seat 22 may be constructed from a variety of different materials. For example, as shown in FIGS. 10A and 10B, an interior skeleton 32 (or understructure) of the reversible seat cushion 30 may be constructed out of a material configured to support a significant amount of weight (i.e. the occupant), such as metal or expanded polypropylene (EPP). The anchoring mechanism 90 may be constructed out of a strong and hard material, such as metal (e.g. metal brackets). The cushion area 34 may be constructed out of a soft material, such as foam, for comfort. The trim cover 36, which may wrap at least a portion of the reversible seat cushion 30, may aesthetically correlate or match with the vehicle seat 22 with materials such as leather, fabric, or vinyl. The storage area 38, such as the tray or cup holders, may be constructed out of plastic.

Figure 11:
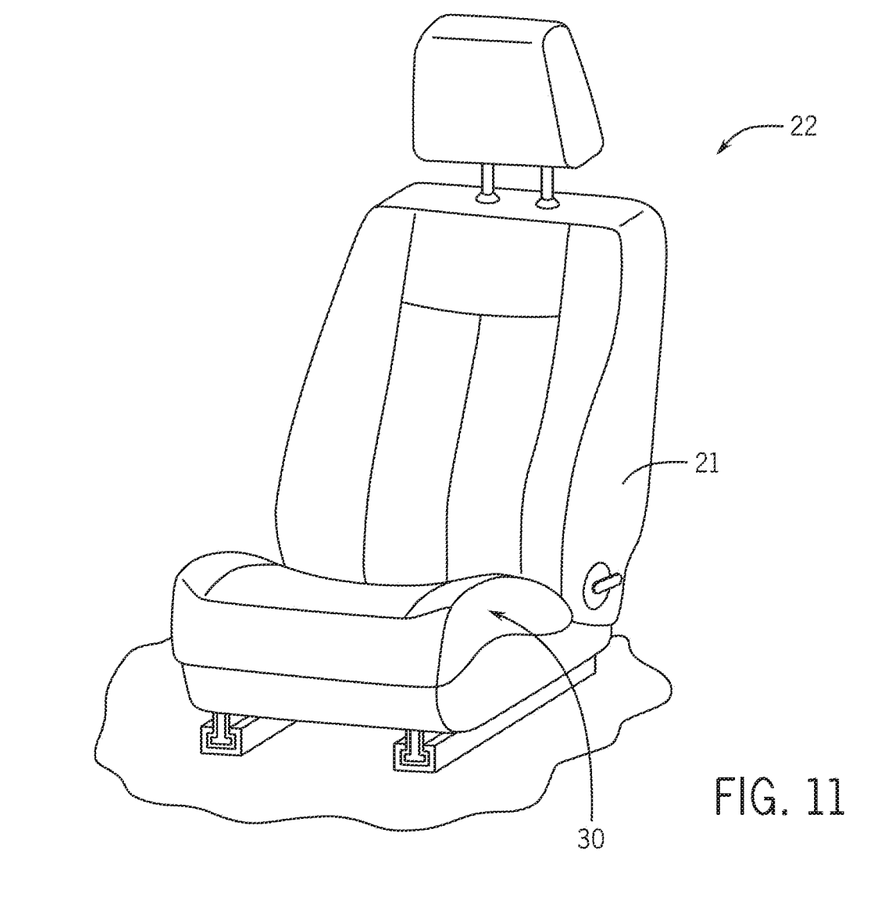
FIG. 11 is a perspective view of a vehicle seat that may be disposed in the vehicle of FIG. 1.

According to another embodiment, the vehicle seat 22 may be a stand-alone seat, as shown in FIG. 11. The vehicle seat 22 that is stand-alone may also have the various components and configurations of the vehicle seat 22 that is within a row of vehicle seats, such as the reversible seat cushion 30.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

The embodiments disclosed herein provide a vehicle seat with a reversible seat cushion that can be switched between two configurations: a seating area and a storage area. Besides those embodiments depicted in the figures and described in the above description, other embodiments of the present invention are also contemplated. For example, any single feature of one embodiment of the present invention may be used in any other embodiment of the present invention.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. A vehicle seat for providing seating for an occupant within a vehicle, comprising:
   an anchoring mechanism; and
   a reversible seat cushion that is configured to be reversible between a seating position and a storage position and to be removable from and attachable to the anchoring mechanism in each of the seating position and the storage position,
   wherein the reversible seat cushion includes a seating side and a storage side,
   wherein, in the seating position, the seating side is exposed to provide support beneath the occupant and the storage side is concealed,
   wherein, in the storage position, the storage side is exposed to provide a storage area and the seating side is concealed.

2. The vehicle seat of claim 1, wherein the seating side and the storage side are on opposite sides of the reversible seat cushion, and the reversible seat cushion is rotatable 180 degrees to switch between the seating position and the storage position.

3. The vehicle seat of claim 1, further comprising a seat back configured to provide support to a back of the occupant, wherein the reversible seat cushion is attachable to the anchoring mechanism to position the reversible seat cushion on or near the seat back of the vehicle seat.

4. The vehicle seat of claim 1, wherein the reversible seat cushion comprises a latching mechanism configured to attach the reversible seat cushion to the anchoring mechanism.

5. The vehicle seat of claim 1, further comprising a release mechanism configured to detach the reversible seat cushion from the anchoring mechanism.

6. The vehicle seat of claim 5, wherein the release mechanism includes a pull tab.

7. The vehicle seat of claim 1, further comprising two adjacent seat cushions, wherein the reversible seat cushion is positioned between the two adjacent seat cushions in the seating position and the storage position.

8. The vehicle seat of claim 1, further comprising at least one adjacent seat cushion, wherein an edge of the reversible seat cushion is configured to be flush and level with an edge of the at least one adjacent seat cushion in the seating position and the storage position.

9. The vehicle seat of claim 1, further comprising at least one adjacent seat cushion, wherein the storage side of the reversible seat cushion includes at least a portion of an inboard side-bolster region of the at least one adjacent seat cushion.

10. The vehicle seat of claim 1, wherein the seating side is substantially flat.

11. The vehicle seat of claim 1, further comprising a removable modular component configured to fit within the storage side of the reversible seat cushion.

12. The vehicle seat of claim 1, further comprising a support region including a lowered center region within raised sides, wherein the seat side is configured to rest on the raised sides in the storage position, wherein the storage side and the support region are complementary such that the storage side is flush with the lowered center region and the raised sides in the seating position.

13. The vehicle seat of claim 12, further comprising a recessed storage area within the lower support region that is accessible when the reversible seat cushion is removed.

14. The vehicle seat of claim 1, wherein the reversible seat cushion includes a cushion-side electrical connector configured to be attachable to and removable from a vehicle-side electrical connector to access electricity from the vehicle.

15. The vehicle seat of claim 1, wherein the reversible seat cushion is configured to be reattachable to the anchoring mechanism.

* * * * *